(12) United States Patent
Moran (10) Patent No.: US 8,065,850 B1
(45) Date of Patent: Nov. 29, 2011

(54) MORTARLESS MODULAR PRECAST CLADDING SYSTEM

(76) Inventor: Damian Antony Moran, Nederland, CO (US)

( * ) Notice: Subject to any disclaimer, the term of this patent is extended or adjusted under 35 U.S.C. 154(b) by 506 days.

(21) Appl. No.: 11/305,776

(22) Filed: Dec. 16, 2005

Related U.S. Application Data (60) Provisional application No. 60/593,189, filed on Dec. 20, 2004.

(51) Int. Cl.
*E04B 2/00* (2006.01)
(52) U.S. Cl. .............................. 52/418; 52/386; 52/435
(58) Field of Classification Search .................... 52/384, 52/385, 386, 435, 477, 506.05, 511, 329, 52/389, 418, 762, 506.08, 700, 327, 330, 52/333
See application file for complete search history.

(56) References Cited

U.S. PATENT DOCUMENTS

| 1,070,375 | A | * | 8/1913 | Reyam et al. | 52/389 |
| 4,546,024 | A | * | 10/1985 | Brown | 428/44 |
| 4,678,152 | A | * | 7/1987 | Cheng | 248/225.11 |
| 5,138,813 | A | * | 8/1992 | Cooney et al. | 52/600 |
| 5,657,597 | A | * | 8/1997 | Loftus | 52/274 |
| 6,253,515 | B1 | | 7/2001 | Kuelker | |
| 2003/0066259 | A1 | * | 4/2003 | Sudweeks | 52/506.05 |

* cited by examiner

*Primary Examiner* — Eileen D Lillis
*Assistant Examiner* — Branon Painter
(74) *Attorney, Agent, or Firm* — Conley Rose, P.C.

(57) ABSTRACT

A modular architectural precast cladding system that is completely mortarless, and not subject to the inherent deficiencies of masonry materials and practice. Simple, rapid and uniform installation, with automatic alignment and self leveling features. A multi-purpose mechanical connector that is either cast-in-place at point of manufacture, or alternatively can be anchored later on the jobsite.

10 Claims, 9 Drawing Sheets

MORTARLESS MODULAR PRECAST CLADDING SYSTEM

CROSS-REFERENCE TO RELATED APPLICATIONS

This application claims the benefit of provisional patent application No. 60/593,189, filed Dec. 20, 2004.

STATEMENT REGARDING FEDERALLY SPONSORED RESEARCH OR DEVELOPMENT

Not applicable.

FIELD OF THE INVENTION

This invention relates to cladding systems, specifically to architectural precast modular concrete cladding systems designed to replace building mortars.

BACKGROUND OF THE INVENTION

Conventional practice for most architectural precast concrete cladding systems requires a labor and material intensive full masonry application. Examples of such architectural cladding systems would be manufactured stone, stucco, and either cementitious or hard-coat, synthetic stucco also known as Exterior Insulation Finish Systems (EIFS), and concrete or clay brick cladding. These practices necessitate a 2-3 step sequential process requiring prep or scratch coat, a separate wire mesh, or lath affixed to the prep coat, and finally a bed of mortar to set and adhere the cladding material to the structure. This 2-3 step method requires the contractor to mobilize and demobilize the labor force and equipment twice or more for the same job. This is due to the need for the initial prep or scratch coat to dry and set up for 48 hours prior to completing the stone, stucco, or brick installation. Some applications could require multiple prep coats. A major problem with these cladding systems is the absence of an engineered drainage gallery or rainscreen to deflect moisture away from the cladding and structure.

Additionally, the absence of airspace for ventilation between the cladding and the structure is a deficiency. These deficiencies are the precursor to the development of mold and dry rot, which threatens the health of the occupants and the value of the structure. Another limitation of the above cladding systems is that the masonry material or mortar is only as good as how it is mixed on the jobsite. Mixed or applied improperly the mortar is subject to cracking and failure, causing the cladding system to fail and possibly fall off the building. Brick and stone systems are also much thicker in volume and heavier in weight. This increases costs for production, handling and transportation. Conventional masonry practice is also vulnerable to the elements, which prevents the installation during inclement conditions. The cladding systems could further be compromised by a sudden change in the weather during the installation, or 48 hours after completing the installation while the mortar is setting up to material strength specifications. The reality is that conventional mortar by its very nature is permeable, even mixed and applied properly under the right weather conditions, and is subject to predictable degradation from the elements.

An improvement to such practice and cladding systems is disclosed in U.S. Pat. No. 6,253,515 to Kuelker, 2001 Jul. 3. This patent employs a mortarless method for attaching a precast concrete cladding system with a mechanical connection, precluding the need for a full masonry application. A bead of caulking is applied to the joints to complete the cladding system. However, this prior art suffers from several disadvantages which limit its functionality, durability, constructability and mass production capability.

First, the hangars or connectors are designed to be cast-in-place on the back of the precast cladding units at point of manufacture only. There is no disclosed provision for anchoring or fastening connectors in the field after manufacture. This limitation impacts the mass production of the system for precast manufacturers with automated or robotic production processes. This in turn restricts achievable economies of scale required to manufacture the system in a cost efficient manner. Additionally this cast-in-place only option requires more labor and materials for packaging and transport of the system to the jobsite.

Second, the shape, profile, and gauge of the hangars or connectors per FIGS. 10, 11 and 14 of U.S. Pat. No. 6,253,515 referenced above, expose the system to damage during transport and handling in the field. Deformation of these hangars render the system vulnerable to total failure, as the structural integrity of the hangar is the sole means for connecting the cladding to the building.

Third, the dimension of the drainage gallery that results from the profile of the hangar is inadequate for wetter climates and coastal regions.

Fourth, there is no claimed means for providing automatic alignment and self-leveling features for the installers, who then have to make these adjustments manually on site.

Fifth, there is no provision for panelizing the system, thereby allowing the system to be cast in larger panel dimensions, with architectural façade joints that give the appearance of several individual tiles or units, but are in fact cast as one single panel. This limitation further hinders achievable manufacturing, shipping and installation efficiencies.

Sixth, there is no reference to the utilization of recycled materials such as fly ash, coal combustion by products, and recycled glass fibers in the manufacture of the system. Thereby addressing several economic and environmental concerns, given dwindling stocks and rising costs of Portland cement. Additionally obstructing the ability for the producer to achieve stronger compressive material strength, lighter material weights, and the reduced carbon footprint of fly ash cements compared to production of conventional Portland cements.

Seventh, there is no claimed means for a cladding system that can absorb post construction settlements, thermal expansion and certain seismic activity. Eighth, there is no disclosed provision for a monolithic structural/architectural wall assembly. Whereby, the cladding system can be preassembled in the factory, or sandwich style rapidly on site to a structural wall component, such as tilt-up precast walls, or the new prefabricated structures and homes. Thereby preventing the need for two separate wall components or applications, to provide one wall assembly as with conventional building practice.

Finally, there is no provision for a cladding system, given its mortarless nature, which can incorporate an ultra thin and lightweight solar film cell embedded in the precast units to regenerate the power of natural sunlight into functional energy sources.

Consequently, there is a need in the industry for a mortarless modular architectural precast cladding system that is an improvement to the prior art, and overcomes the limitations and disadvantages of this prior art as outlined above.

BRIEF SUMMARY

In one aspect the invention provides an assembly for constructing a mortarless modular precast cladding system for residential and commercial buildings. Said assembly monolithic in form, comprised of a plurality of precast concrete tiles or panels of predetermined dimension and geometry, manufactured with an engineered multi-purpose mechanical connector cast-in-place at point of manufacture. Said mechanical connection consisting of either predetermined gauge galvanized steel, or predetermined comparable strength material, of substantial breadth to provide maximum resilience to deformation from mishandling during either transport or on the jobsite. Said connector fabricated in symmetrical and undeviating geometry, of raised, constant and uniform profile to provide a predetermined engineered drainage gallery and airspace between said tiles or panels and the structure. Said connector fabricated in a continuous U-shape symmetrical geometry to also provide automatic alignment and self-leveling adjustments during installation.

In another aspect the invention provides an independent mechanical connection device, of equivalent breadth, form and geometric properties as referenced above in said channel connector. This separate connection device provides specifically for anchoring or fastening after point of manufacture, generally on the jobsite, to said mortarless modular precast concrete tiles or panels referenced above. Said connection device to provide for simple, rapid and uniform installation of connector in the field to said precast concrete units by unskilled labor.

Finally yet another aspect of the invention provides a preassembled structural and architectural wall assembly that can be shipped and erected in one monolithic form, or assembled sandwich style rapidly on the jobsite. The advantage of this aspect is that the invention precludes the need, per conventional building practice, for two separate wall components or applications to provide one ultimate wall assembly for both structural and architectural, or aesthetic finish.

BRIEF DESCRIPTION OF THE DRAWINGS

Embodiments of the invention will now be described, by way of example only, with reference to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Accordingly, several objects and advantages of my invention are:

(a) to provide both an improved and alternate mortarless mechanical connection design that offers the manufacturer the option of either cast-in-place channel connectors embedded at point of manufacture, or producing the precast cladding units without the connectors in place, and anchored after manufacture on the jobsite.

(b) to provide precast manufacturers with a channel connector that can be fastened later in the field, as opposed to cast-in-place only, to allow automated and robotic production plants to mass produce the system, and achieve better economies of scale with manufacturing, shipping and handling efficiencies.

(c) to provide an improved connection device or multipurpose channel connector, with an undeviating geometric shape and profile, fabricated of stronger and more durable material, to better endure the foreseeable potential for mishandling during transport to the jobsite and staging of materials on the site.

(d) to provide an improved multi-purpose channel connector of undeviating geometric shape and profile that offers an improved and uniform drainage gallery or rainscreen, to better deflect higher volumes of rainwater common in wetter climates and coastal regions.

(e) to provide an improved multi-purpose channel connector of symmetrical geometric shape and profile that allows for automatic alignment and self leveling features, to offer simple, rapid and uniform installation by unskilled labor, and to reduce the margin of error common with cladding systems that otherwise require these alignment and leveling adjustments manually in the field.

(f) to provide an architectural precast cladding system that can be panelized, manufactured in larger tile and panel dimensions, with architectural façade joints cast in the fascia only that give the appearance of several individual tiles, but are in fact cast as one single panel, that provides significant manufacturing, shipping and handling efficiencies, for both producers and installers.

(g) to provide an architectural precast cladding system that can be manufactured from recycled materials, such as fly ash, coal combustion by products, and recycled fibers, rather than conventional Portland cement, thereby addressing the growing shortages and rising costs of Portland cement.

(h) to provide a cladding system that given the use of the recycled materials referenced above, allows the producer to manufacture a precast cladding system that results in superior architectural definition, workability and likeness of texture to natural materials such as stone, granite, slate and limestone.

(i) to provide a precast cladding system that is stronger in material compressive strength and lighter in material weight due to the use of these recycled materials, and more environmentally resourceful as these recycled materials would otherwise require disposal in landfill sites.

(j) to provide a unique cladding system that is engineered to withstand settlements due to post construction subsidence, common in new housing developments, thermal expansion of manufactured concrete products during acute thermal cycles, and certain seismic activity that could typically degrade the aesthetic and structural properties of masonry concrete cladding systems.

(k) to provide a cladding system that can be preassembled at the plant, or rapid sandwich style on the jobsite, to structural wall members such as precast tilt-up walls, the new lightweight precast aerated concrete panels, and also the new prefabricated structures and homes, thereby offering a monolithic combination structural/architectural wall assembly in one form, that precludes the need for 2 separate wall components or applications, as with conventional building practice.

(l) to provide an improved method of manufacturing precast concrete panels, tiles, moldings and architectural trim and accessories for windows, doors and columns, by producing multiple units simultaneously with each pouring of concrete, as opposed to the conventional practice of casting units individually.

Figure 1A:
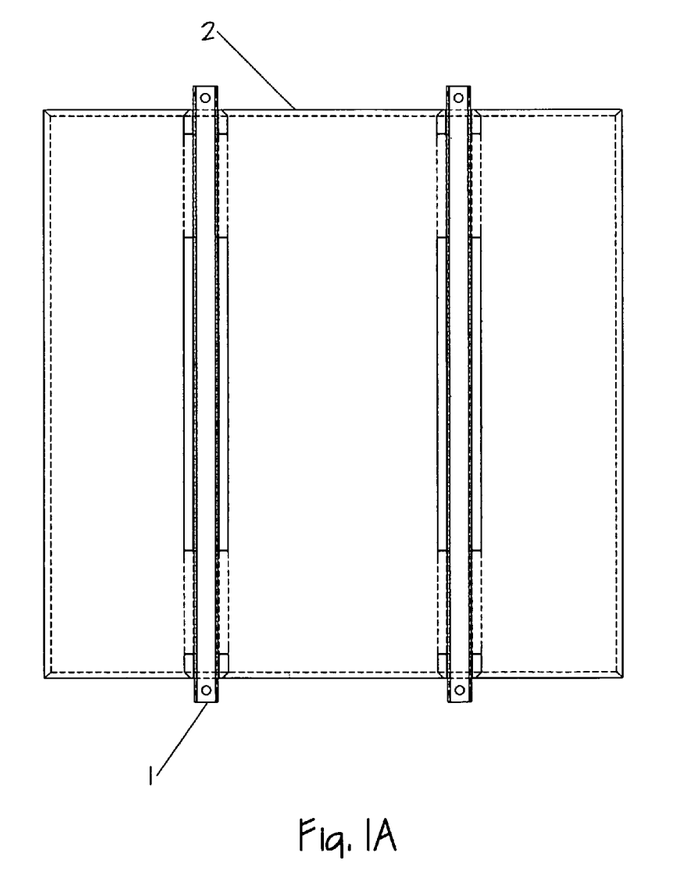
FIG. 1 is a perspective view of the front, back, side and top of a typical precast concrete tile or panel.
Figure 1B:
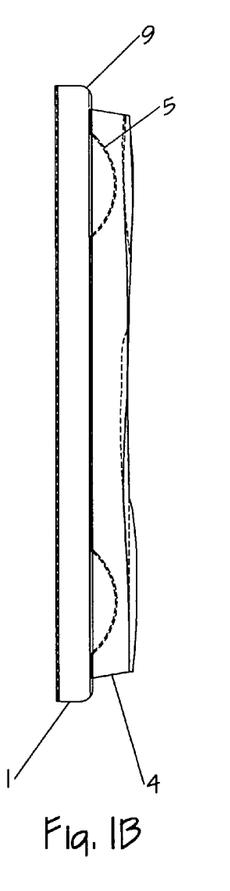
Figure 1C:
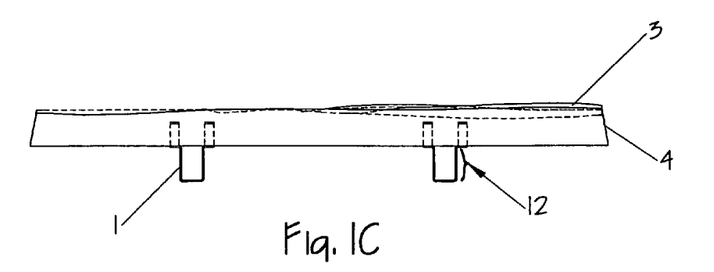
Figure 2:
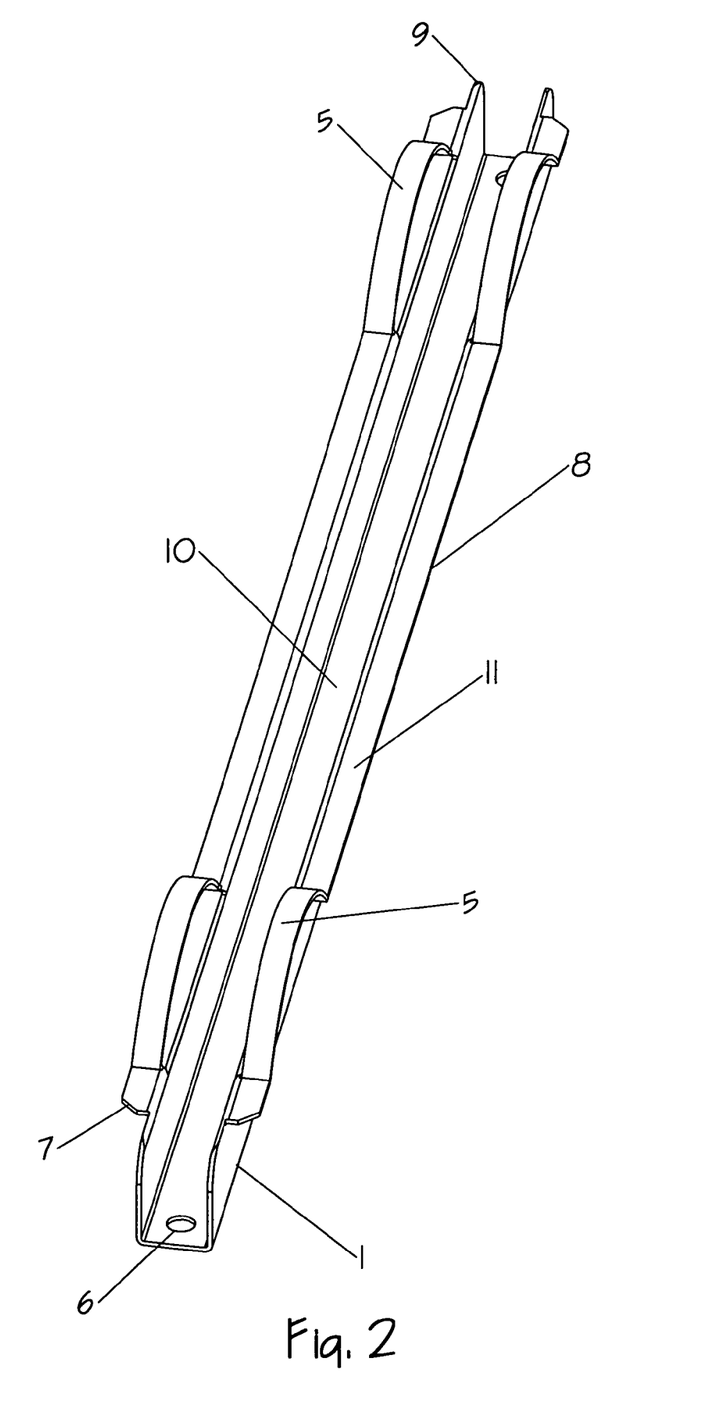
FIG. 2 is an isometric view of said typical precast unit prior to attachment to the sheathing of the building.
Figure 3:
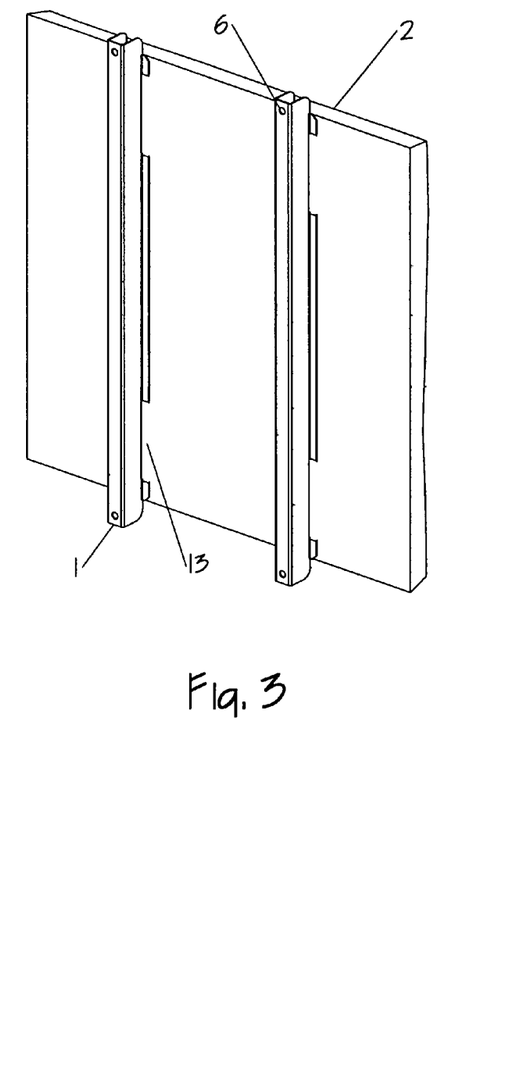
FIG. 3 is a perspective view of the back face of the said precast unit showing a cast-in-place mechanical connector of symmetrical and undeviating profile.
Figures 4, 5:
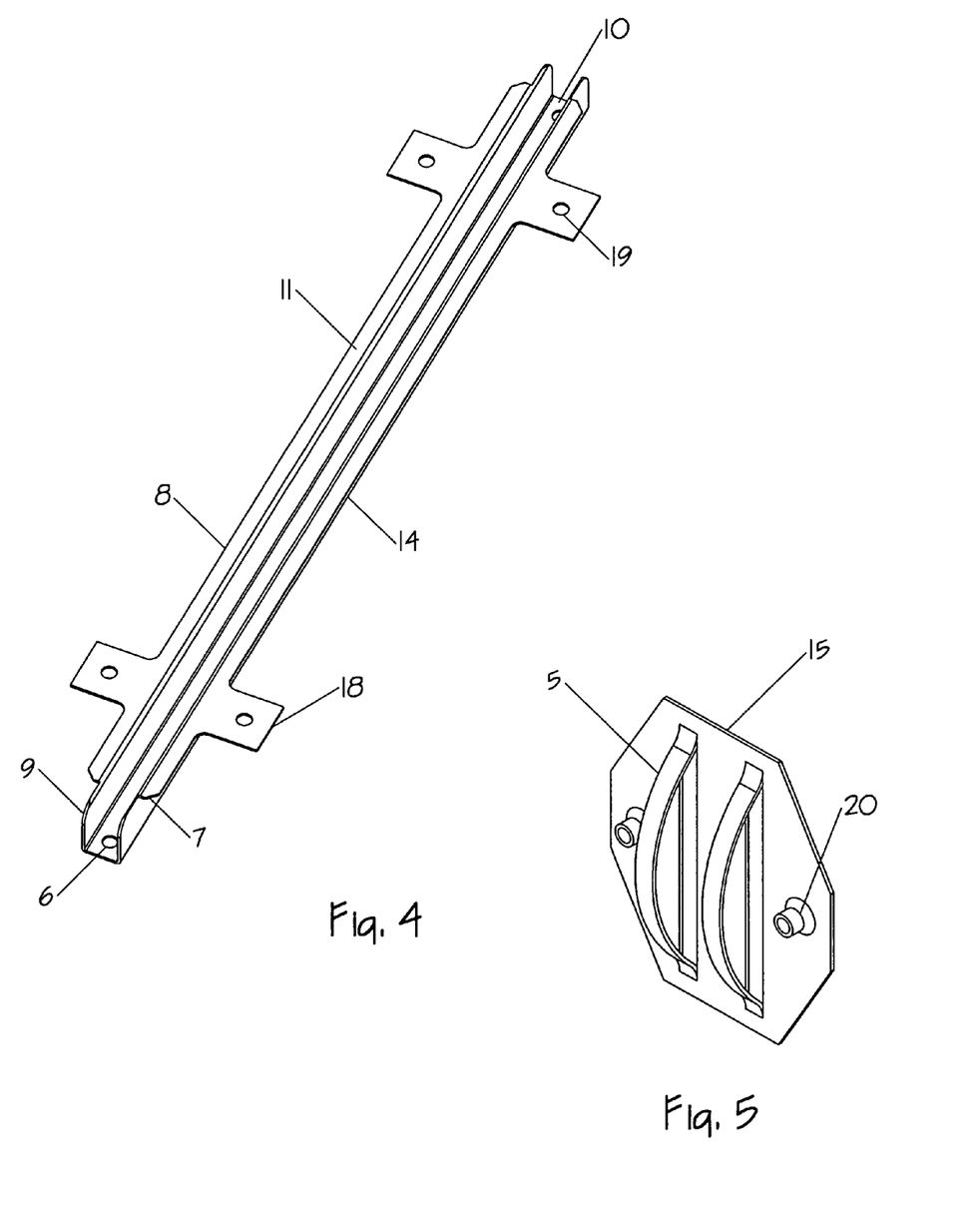
FIG. 4 is a photographic illustration of the back face of said precast units showing two said mechanical connectors aligned and embedded vertically.
FIG. 5 is a photographic illustration of the front face of typical precast units showing achievable textures to replicate the aesthetics of natural materials.

(m) to provide an architectural precast cladding system that has the capability to embed the new ultra thin and lightweight printable film solar cells in the precast units themselves, to convert natural sunlight into functional energy sources within the confines of the respective property and structure. Further objects and advantages of my invention will become apparent from a consideration of the drawings and ensuing description:

Reference is made to FIGS. 1 and 3, which show a perspective view of the invention from the front, back, side and top view. The conceptual functionality of the invention for a mechanical connection of the cladding unit to the building sheathing is illustrated in FIG. 2. The embedment of the channel connector to the back of the precast cladding unit is illustrated in FIG. 1B. Specifically, FIGS. 1 and 3 show the front and perspective view of the architectural precast cladding unit 2, with the top and bottom of the embedded channel connector 1 shown from the front view in FIG. 1A. The precast cladding unit 2 can be of variable dimension and texture. This could be in the form of a tile that ranges from 6" wide by 12" high, to 18" wide by 12" high, for residential applications. Alternatively, a panel that approximates 60" wide by 18" high for both residential and commercial applications. Said panel 2 being cast with architectural façade joints cast in the fascia only that give the appearance of several individual tiles or units, but in fact is cast as one single panel 2 to provide manufacturing, shipping and handling efficiencies. The multi-purpose channel connector 1 shown in dual dimensional view in FIG. 2 is fabricated so as to be of undeviating or uniform shape and raised profile. The engineering logic here is to design a structural member which is symmetrical and resistant to mishandling and consequential damage during transport. This connector 1 is 19 gauge galvanized steel, aligned vertically on the back face of the precast unit, and fabricated so as to withstand impact without deforming the shape of the member. A U-shape or profile channel connector 1 that provides a ½" to ¾" drainage gallery, depending on the grade of application and region of the country, between the cladding and the structure, given the raised profile of the channel connector 1. The pullout shear strength on the connectors 1 is over 300 pounds for a precast cladding unit 12" high by 18" wide. This precast unit 2 weighs less than 10 lbs. Therefore the mechanical connection design for the cladding system 2 has a safety factor of 30. The connector design could support vertical wall loads that are 30 times greater than the weight imparted by the precast cladding units 2 on the connectors 1 themselves. The mechanical connection design for the cladding system 2 is comprised of one connector 1 for a precast unit 2 that is 6" wide by 12" high as illustrated in FIG. 1. Two connectors 1 may be used for precast units 2 that are 12" by 12" and 12" high by 18" wide. Three connectors 1 total for precast units 12" high by 24" wide, and 4 connectors 1 total for precast units 2 12" high by 36" wide may be used. Larger panels 18" high by 60" wide require 5 to 6 connectors 1 total.

The raised channel connectors 1 in FIG. 2 measure ¾ " at the butterfly heel 9 and taper to ⅜" at the toe of the channel 10. The connectors 1 have 2 screw holes 6 drilled into each part, one each at the top and bottom of every connector 1. These holes 6 accommodate 1" #6 galvanized screws (not shown) to attach the precast units 2 to the building. The connectors 1 are longer then the precast units 2, protruding ½" above the top and below the bottom of each unit 2. This provides for total concealment of the connectors 1 once the installation is complete. It also provides a full interlock mechanism, whereby the top hole 6 of every connector 1 is screwed to the building sheathing, and the bottom of the channel connector 1 simply slides behind the top of the preceding course of precast concrete units 2.

Finally, a connector 1 that is engineered to provide an interlocking mechanism 9 with the precast cladding units 2 both above and below, and a uniform geometric profile that provides automatic alignment and self-leveling adjustments for the installer. Working from the bottom up only the precast cladding unit 2 can only be aligned one way on the building, and this in direct relation to the preceding course of units 2. The raised and consistent profile of the channel connector 1 provides an automatic leveler, as opposed to having to set stone or brick in a bed of mortar that has no rigidity or guide for leveling, until the mortar sets up later. The connectors 1 could also be fabricated from alternate materials such as some plastics and carbon composites, given the high tensile strengths of these materials.

A variation of the cladding system 2 provides detailed architectural trim, moldings or accessories that can be used to accent and finish areas around doors, windows, and columns. These precast units 2 could be of the same texture as used in the body of the cladding or veneer, or of a contrasting texture to provide accent or definition of these finishing trim units.

Figure 10:
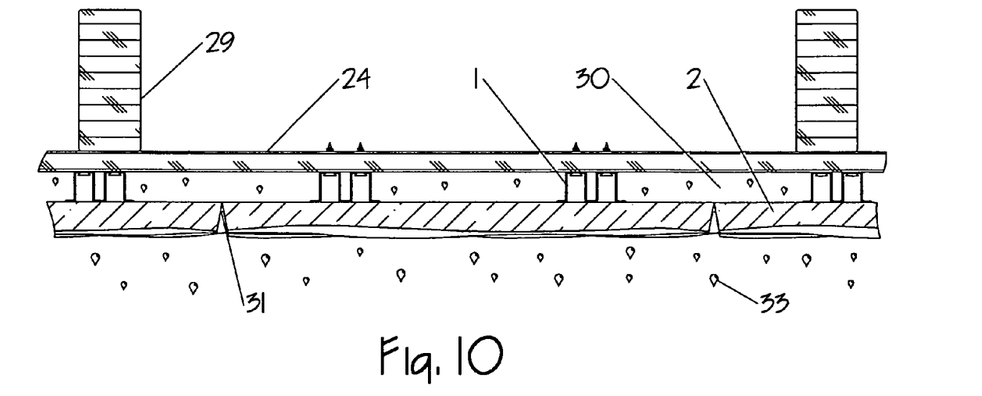
FIG. 10 is a photographic illustration of a sectional view with precast units finished with the expandable polyurethane sealant sanded in the joints.
Figure 11A:
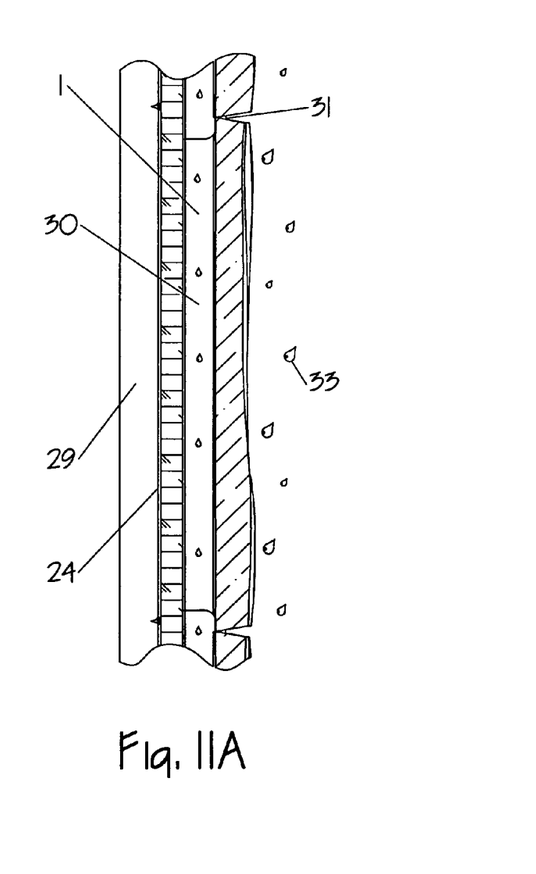
FIG. 11 is an isometric view of an alternative embodiment of the invention showing said mechanical connectors anchored after point of manufacture, generally on the jobsite, for simple, rapid and uniform installation.
Figure 11B:
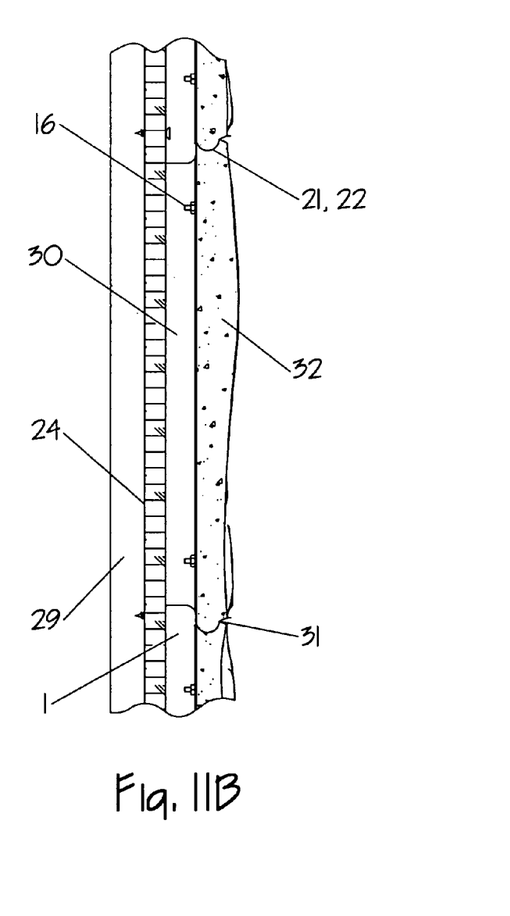

FIG. 10 shows the drainage gallery 30, gap, or rainscreen that results from the raised profile of the channel connector 1 once connected to the structure 24. Depending on which connection design is used this drainage gallery 30 ranges from ½" to ¾" in dimension. The rainscreen design provides engineered protection against mold and dry rot, as moisture is deflected from the cladding 2 and the building 24 to a discharge point for drainage. Additionally this gallery or gap 30 in between the cladding 2 and the building 24 provides airspace for ventilation and pressurization equalization. FIG. 10 further illustrates a sectional view of the precast cladding units 2 in tandem with joints 31 that have been sealed with an expandable polyurethane sealant. This sealant is specially formulated for dynamically moving building joints 31. This expandable sealant can accommodate dynamic and anticipated building 24 movements from foundation soils post construction, thermal expansion and certain seismic activity.

This provides the cladding system 2 with the ability to withstand up to 50% joint space deflection from post construction dynamics. The dimension of the joint is generally ½" in width and ¾" in depth. The sealant is designed for temperatures that range from a low of minus 65 F to a high of 180 F. Once the joint 31 is caulked the sealant is sand-coated by brush. This replicates the appearance of a traditional masonry joint, although a much more durable and functional joint than the conventional masonry joint.

The manufacture of this type of precast cladding system 2 is generally achieved with a wet cast fabrication process. This method involves the pouring of wet slurry premixed in accordance with the particular product specifications. One of the variables in the mix design could be whether the application is residential or commercial, non-coastal or coastal regions, and the texture or finish required. The slurry is dispensed from overhead hoppers and controlled by an operator who directs the slurry into custom molds or forms. Typical industry practice would have these filled molds moving continuously on a conveyor belt system, where they are unloaded onto a vibrating or shaker table. The vibration increases the material density through compaction and distribution of the water with the solids to form a cohesive mass within the mold. The molds are then moved to a staging or curing area that is climate controlled to allow the precast units to set or cure properly prior to demolding, packaging, and shipping. This conventional practice is labor intensive and does not provide for efficient mass production and economies of scale.

The preferred embodiment of the invention provides an improved method for manufacture and mass production of the cladding system 2. This method provides for dispensing the slurry with controlled dosage into multi-cavity forms, configured in sheet orientation to house multiple master molds. For the preferred embodiment the molds have interior cavities to retain the channel connectors 1 in place during the pour. The molds are filled to capacity, whereby vibration commences from a platform directly underneath the multi-cavity forms. Once the vibration is complete mechanized carriers move the forms to curing rooms where the precast units 2 are cured prior to packaging and shipping. This method of manufacture allows for producing multiple precast units 2 simultaneously to achieve improved economies of scale.

Figure 6:
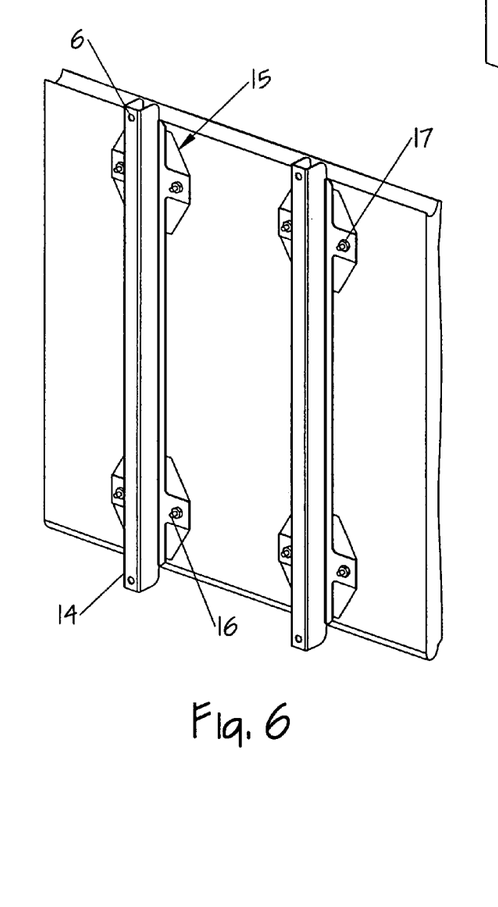
FIG. 6 is a photographic illustration of the front face of a molding or architectural trim unit showing the clarity and textural definition of the accessories.
Figure 8:
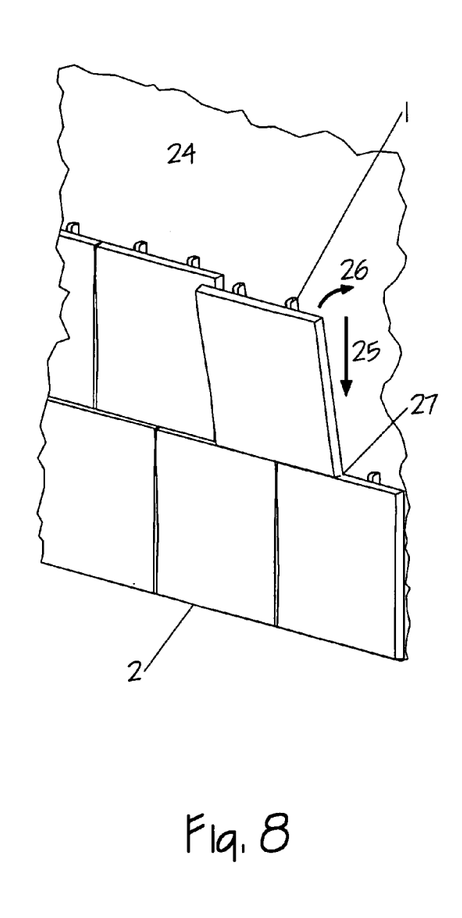
FIG. 8 is a perspective view of the engineered drainage gallery between the precast cladding units and the structure to provide protection against mold.
Figure 9:
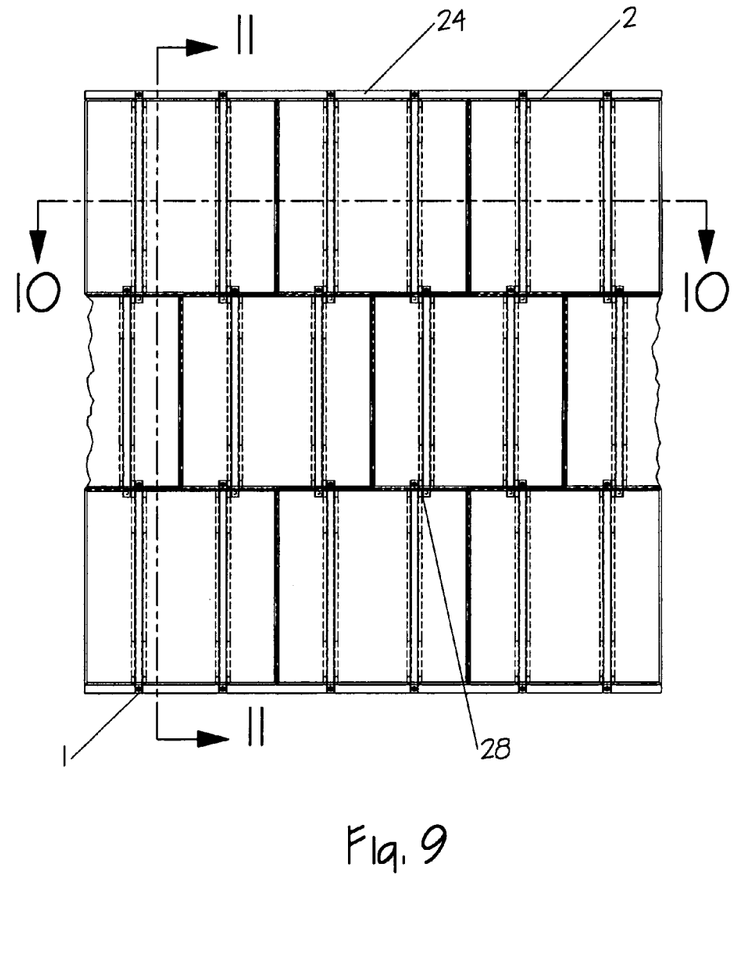
FIG. 9 is a photographic illustration showing the panelization of the invention with architectural façade joints cast in the fascia only of the precast unit to give the appearance of individual pieces, but in fact cast as one single panel.

Referring now to FIGS. 3 and 6, the illustrations show an example of the precast cladding unit 2, with the multi-purpose channel connector 1 cast-in-place at point of manufacture. A galvanized screw is threaded through the hole 6 in the top of the channel connector. This attaches the monolithic cladding system 2 in a simple, repetitive, and uniform manner to the sheathing of the structure 24 as illustrated in FIGS. 8 and 10. Architectural accessories and finishing trim 6 can be used to accent the cladding 2. Various textures can be replicated to produce the look of natural materials such as stone, slate, granite and limestone. The mechanical connection 1 of the cladding system 2 provides a drainage gallery 24, or rainscreen FIG. 8, and airspace between the materials to protect against mold, moisture and dry rot problems. The mortarless modular precast cladding installation is completed by caulking the joints 31 with an expandable sealant. This provides the cladding system 2 with the ability to withstand post construction settlements, thermal expansion, and certain seismic activity. Specifically, the mortarless modular precast cladding system 2 has the capability to withstand up to 50% joint deflection due to these conditions as discussed previously. Finally, the sealant is sand coated by brush stroke to replicate the aesthetic appearance of a traditional masonry joint. References above to particular dimensions, sizes and shapes are not disclosed to be restrictive to the invention. Rather they are provided as examples of conceptual functionality, with variations thereof that are further contemplated as inherent derivatives and extrapolations within the body of the invention.

FIGS. 3 and 6 illustrate one embodiment, and the operation of this embodiment involves a plurality of modular precast cladding units 2 with a multi-purpose channel connector 1 that is embedded into the back face of the precast units 2 at point of manufacture. These precast cladding units 2 can consist of tiles, panels and architectural accessories or moldings to accent or finish the main body of the cladding 2. This arrangement allows the monolithic cladding system 2, comprised of the precast cladding unit 2 together as one with the channel connector 1, to be simply screwed to the sheathing of the building 24. The installation is completed by caulking the joints with a specially formulated sealant that is then sand coated to replicate a traditional masonry joint.

Figure 7A:
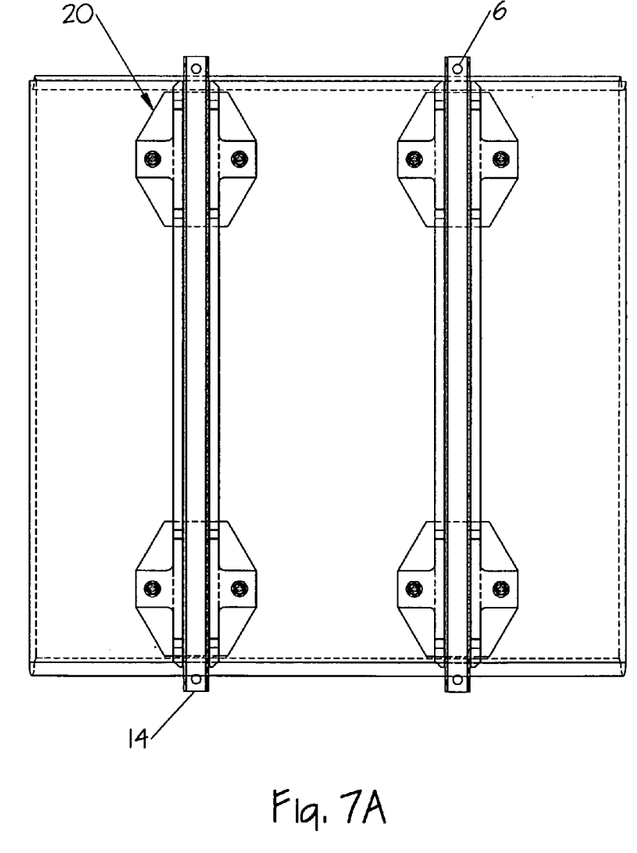
FIG. 7 is a photographic illustration of the back face of a typical molding or architectural accessory showing a schematic configuration of the connectors.
Figure 7B:
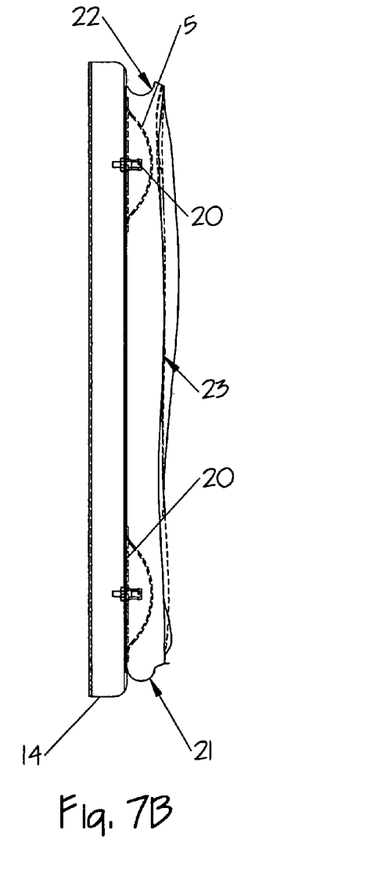
Figure 7C:
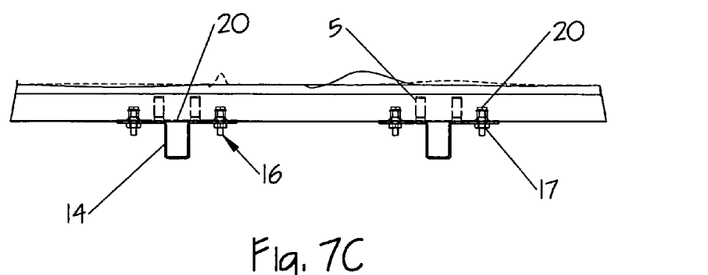

An alternative embodiment of the invention is shown in FIGS. 6 and 7. This arrangement provides a plurality of modular precast cladding units 2 with a multi-purpose channel connector 14 that is not cast-in-place. Rather, the multi-purpose channel connector 14 is anchored or fastened to the back face of the precast cladding units 2 after manufacture, generally on the jobsite.

The operation of this alternative embodiment again involves a plurality of modular precast cladding units 2 with a mechanical connection method 14. The difference being that in this arrangement the channel connectors 14 are not embedded at point of manufacture. Rather, the connectors 14 are anchored or fastened to the back face of the precast cladding units 2 after manufacture. This is generally done on the jobsite. The operation and interconnection of the system components and parts under this arrangement does not deviate from the most preferred embodiment referenced above, other than when the connectors 14 are attached to the back face of the precast units. The advantage to this alternative embodiment is of substantial magnitude. This being that some manufacturers operate fully automated production facilities, with some of these facilities operating strictly with the use of robotics. A modular precast cladding system 2 with a mechanical connector 14 that is not cast-in-place allows achievable manufacturing efficiencies relating to economies of scale, which would not be achievable if the connector was required to be embedded only at point of manufacture. This alternative embodiment also simplifies handling and freight.

Figure 12A:
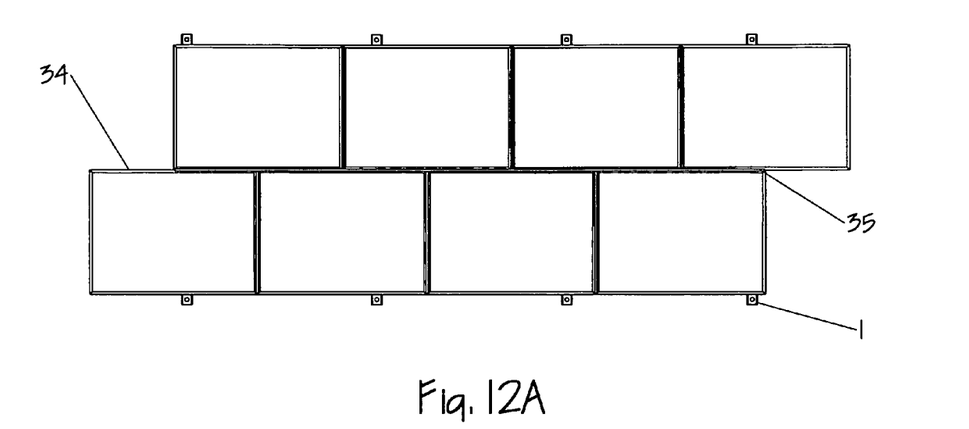
FIG. 12 is an isometric view of an additional alternative embodiment of the invention projecting the sequence for a preassembled structural and architectural wall assembly that can be shipped and erected in one monolithic form.
Figure 12B:
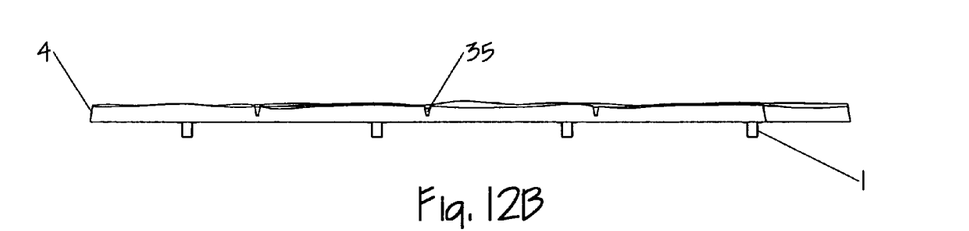
Figure 12C:
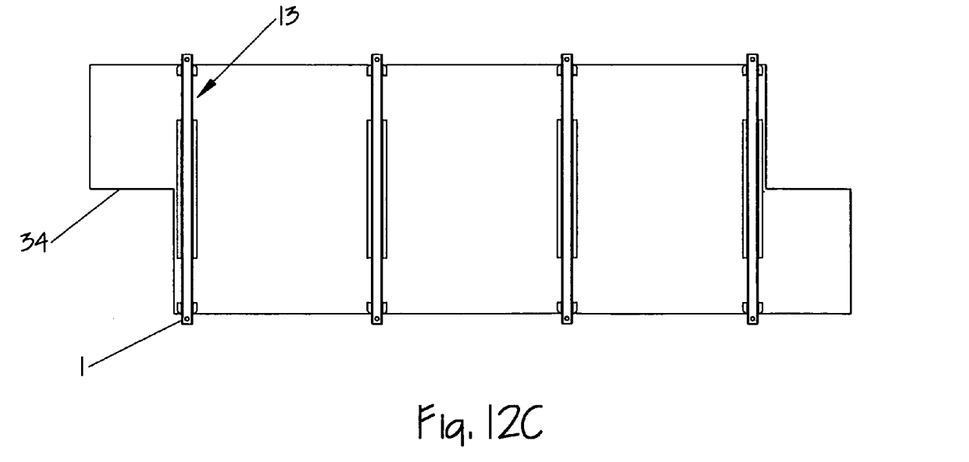
Figure 13A:
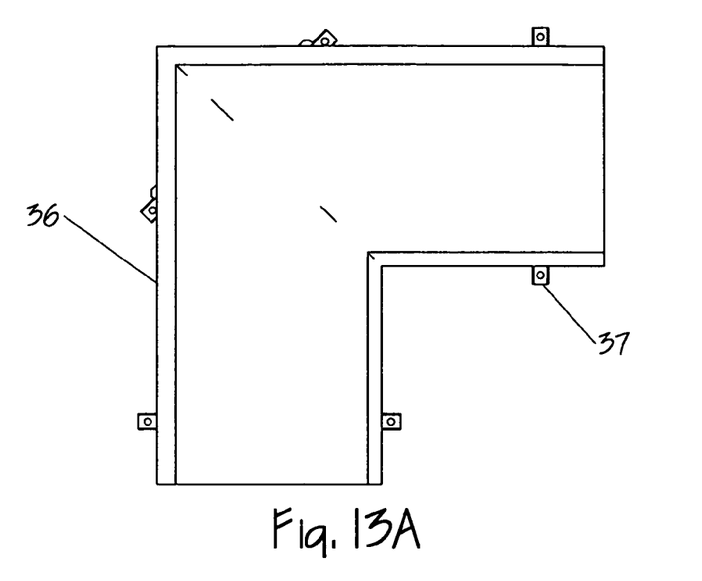
FIG. 13A is a front view of an additional alternative embodiment of a preassembled structural and architectural wall assembly that can be shipped and erected in one monolithic form.
Figure 13B:
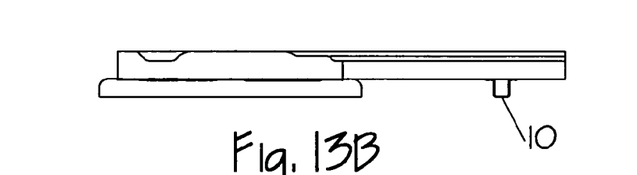
FIG. 13B is a side view of an additional alternative embodiment of a preassembled structural and architectural wall assembly that can be shipped and erected in one monolithic form.
Figure 13C:
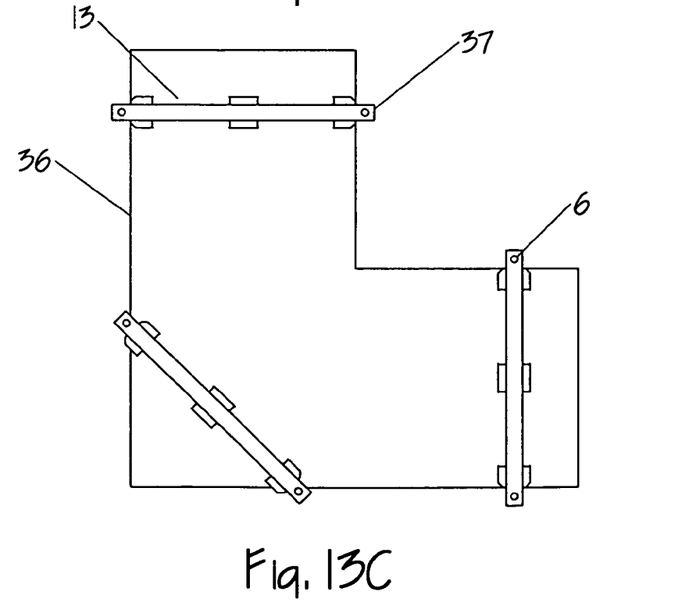
FIG. 13C is a rear view of an additional alternative embodiment of a preassembled structural and architectural wall assembly that can be shipped and erected in one monolithic form.

Another alternative embodiment of the invention is shown in FIG. 12. This unique arrangement again involves a plurality of modular precast cladding units that employs a multi-purpose mechanical channel connector that is cast-in-place at the point of manufacture. However, the difference under this additional alternative embodiment is again of substantial magnitude. The mortarless modular precast cladding system can be preassembled to a structural wall component in a separate and unrelated production facility. This can be a production facility that manufactures structural wall panels, also known as precast tilt-up panels used to build commercial, industrial and institutional structures. Or a plant that manufactures the new prefabricated homes and structures, that offer advantages compared to conventional jobsite only building practice. The advantage this arrangement offers is one of a preassembled, fully integrated structural/architectural wall assembly shipped and erected in one form. Thereby precluding the need, per conventional building practice, for 2 separate wall components or applications. Building one separate structural wall assembly or member, to be followed by a second separate wall system or application for aesthetic or architectural finish, with one ultimate wall assembly.

The operation of this additional alternative embodiment again involves a plurality of mortarless modular architectural precast cladding units that employs a cast-in-place mechanical connector. The operation and interconnection of the components and parts of the cladding system under this additional alternative embodiment does not deviate from the most preferred embodiment referenced above. The advantage to this additional alternative embodiment is substantial. This arrangement will provide a preassembled, fully integrated structural/architectural wall assembly that can be shipped in one form and erected on the jobsite in one form. Thereby saving the rising costs of jobsite labor, and the need, per conventional practice, to build 2 separate wall systems to provide one ultimate wall assembly.

Accordingly, the reader will see that this invention is novel and useful for a multitude of reasons. The invention offers manufacturers a choice of whether their production processes should provide for the mechanical connector to be cast-in-place at point of manufacture, or anchored to the precast units later in the field. Apart from the economics of improved economies of scale for mass production, the alternative embodiment offers packaging and shipping advantages. The invention provides an improved mechanical connection device, method and form compared to U.S. Pat. No. 6,253,515 to Kuelker, 2001 Jul. 3. These improvements relate to a more durable and substantive connector better able to absorb foreseeable mishandling during transport and jobsite installation. A manufactured-to-tolerance connector that provides an improved drainage gallery and airspace, for better-engineered protection against mold, moisture and dry rot conditions. A symmetrical connector of undeviating geometry and uniform profile that provides automatic alignment and self-leveling features for the installers. A mortarless modular precast cladding system that provides manufacturing, shipping and handling efficiencies, given the panelizing concept to reduce the need for numerous small pieces. The utilization of recycled materials in the manufacturing process provides economic, architectural and environmental advantages when compared to using conventional Portland cements. The invention provides a new modular precast cladding system with the ability to withstand post construction settlements, acute thermal cycles, and certain seismic activity. The provision of a preassembled, fully integrated structural and architectural wall assembly that can be shipped and installed in one monolithic form provides substantial advantages for economics and logistics.

While my above description contains many specificities, these should not be construed as limitations on the scope of the invention, rather as an exemplification of one preferred embodiment thereof. Many other variations are possible and contemplated. For example this precast cladding system, given its mortarless and modular composition, is also ideally suited for interior wall tile applications that currently require full masonry materials and installation Another example is the means for improving the mass production of modular precast units with a casting method that employs multi-cavity molds configured in sheet or gang orientation so as to produce multiple units simultaneously, compared to the conventional practice of pouring concrete into individual molds or forms one at a time. Accordingly, the scope of the invention should be determined not by the embodiments outlined and illustrated, but by the appended claims and their legal equivalents.

I claim:

1. A façade assembly for buildings, comprising:
   a façade panel, having a front face and a rear surface;
   a load member, having a first end and a second end, and including:
      a base member extending between the first and second ends and; having a longitudinal axis; and a first plane perpendicular to the base member along the longitudinal axis between the first end and the second end;
      two side walls extending between the first and second ends, and extending away from the base member parallel to the first plane, to form parallel outer edge surfaces and a linear channel with the base member, wherein each of the side walls includes a curved edge, at each of the first and second ends, disposed between the sidewall outer edge surface and the base member, the first and second ends of each sidewall are in the shape of substantially similar butterfly heels, wherein the first and second ends of the load member are defined by the first and second ends of the side walls; and
      an interface connected to the side wall outer edge surfaces, extending perpendicular the first plane to a distal edge, the interface for contacting the façade panel rear surface, the interface having at least one coupling member extending therefrom,
      each coupling member having:
         a first end and a second end connected to the interface;
         a coupling member longitudinal axis extending therebetween, wherein the coupling member longitudinal axis is parallel to the first plane and the longitudinal axis of the base member;
         a width, wherein the coupling member width is measured perpendicular to the coupling member longitudinal axis and the first plane, each coupling member curved away from the interface and parallel to the first plane; and
         a thickness that is less than the width, wherein the thickness is measured parallel to the first plane and perpendicular to the coupling member longitudinal axis;
   wherein each coupling member is embedded in the façade panel to hold the façade panel rear surface against the interface surface and couple the façade panel to the load member;
   wherein the load member is coupled to the façade panel at an intermediate location of the façade panel; and
   wherein the load member is fixably attached to a building surface to construct a vertically and horizontally aligned façade assembly.

2. The assembly of claim 1, wherein the façade panel comprises a cast composite planar member consisting of at least 3 sides, having a decorative front surface, and a rear surface for interfacing with the load member.

3. The assembly of claim 1, wherein the coupling member comprises an arched loop extending from the interface surface and away from the base member.

4. The assembly of claim 1, wherein each load member further comprises a first interlocking surface for fitment behind an adjacent façade panel during construction of the façade assembly, the interlocking surface comprising a portion located between the interface and the curved edge.

5. A façade assembly for buildings, comprising:
a plurality of façade panels fixably mounted to the building in a vertically successive manner, each panel comprising a cast composite planar member consisting of a decorative front surface, a rear surface for interfacing with a load member, and a plurality of sides disposed on the panel per between the front surface and the rear surface, wherein each side interlocks with a side of an adjacent façade panel using a tongue and groove;
a load member coupled to the rear surface in an intermediate portion of each façade panel, the load member comprising upper and lower ends, a base member, two wall members disposed perpendicular to the base member and defining parallel planes, and an outer edge surface of the walls defining a linear channel between the parallel planes; a butterfly heel disposed at each of the ends of the load member, each butterfly heel defined by a a curved edge on each of the wall members extending between the wall member outer edge surface and the base member, the butterfly heel configured for pivoting the load member about a vertically adjacent façade panel, and an interlocking surface disposed adjacent the butterfly heel for interlocking fitment of the load member behind the vertically adjacent façade panel; and
an interface on the outer edge surface including at least one coupling loop extending therefrom, the coupling loop having a width measured perpendicular to the parallel planes and a thickness that is less than the width, wherein the thickness is measured perpendicular to the to the width and parallel with the parallel planes and the interface including a through passage for receiving one of the façade panels and coupling the rear surface to the interface of the load member.

6. The assembly of claim 5, wherein the at least one coupling loop comprises a loop extending from the interface and coupled to the interface at two ends.

7. The assembly of claim 5, wherein the at least one coupling loop comprises the portion of the loop extending from the interface and embedded in an interior portion of the panel.

8. The assembly of claim 5, wherein the interface comprises a flange extending along a flange longitudinal axis between the upper and lower ends of the load member along each wall member outer edge surface, the flange having a width measured perpendicular to the parallel planes and a thickness measured perpendicular to the width and the flange longitudinal axis, and parallel with the parallel planes.

9. The assembly of claim 8, wherein the flange comprises a width that is greater than the thickness.

10. A façade assembly for buildings, comprising:
a façade panel having a front face and a rear surface;
a load member coupled to an intermediate position of the façade panel rear surface, the load member including:
substantially similar upper and lower ends each including:
a butterfly heel for pivoting the load member about a vertically adjacent façade panel; and
an interlocking surface disposed adjacent the butterfly heel for interlocking fitment of the load member with the vertically adjacent façade panel;
a base member extending between the upper and lower ends; along a longitudinal axis and perpendicular to a first longitudinal plane;
two side walls extending between the upper and lower ends, and extending perpendicularly away from the base member, and parallel to the first longitudinal plane to form outer edge surfaces and a linear channel with the base member;
an interface surface on the side wall outer edge surfaces, extending perpendicularly from the sidewalls and away from the first longitudinal plane, the interface for interfacing with the façade panel rear surface, the interface including a coupling member connected to the interface to form an arch extending from the interface parallel to the first longitudinal plane;
wherein each coupling member includes:
a first end and a second end connected to the interface;
a coupling member longitudinal axis extending therebetween, wherein the coupling member longitudinal axis is parallel to the first longitudinal plane;
a width, wherein the coupling member width is measured perpendicular to the coupling member longitudinal axis and the first longitudinal plane; and
a thickness that is less than the width, wherein the thickness is measured parallel to the first longitudinal plane and perpendicular to the coupling member longitudinal axis;
wherein the coupling loop is embedded in the façade panel to hold the façade panel rear surface against the interface surface and couple the façade panel to the load member at the intermediate position; and
wherein the load member is fixably attached to a building surface to construct a vertically and horizontally aligned façade assembly.

* * * * *